United States Patent
Park

(10) Patent No.: US 12,436,196 B2
(45) Date of Patent: Oct. 7, 2025

(54) BATTERY SELF-DISCHARGE CURRENT MEASUREMENT APPARATUS AND OPERATING METHOD THEREOF

(71) Applicant: LG Energy Solution, Ltd., Seoul (KR)

(72) Inventor: Jae Dong Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 30 days.

(21) Appl. No.: 18/288,729

(22) PCT Filed: Oct. 17, 2022

(86) PCT No.: PCT/KR2022/015702
§ 371 (c)(1),
(2) Date: Oct. 27, 2023

(87) PCT Pub. No.: WO2023/068693
PCT Pub. Date: Apr. 27, 2023

(65) Prior Publication Data
US 2024/0210483 A1 Jun. 27, 2024

(30) Foreign Application Priority Data
Oct. 18, 2021 (KR) .................. 10-2021-0138632

(51) Int. Cl.
*G01R 31/382* (2019.01)
*G01R 31/3842* (2019.01)
*H02J 7/00* (2006.01)

(52) U.S. Cl.
CPC ........ *G01R 31/3842* (2019.01); *H02J 7/0047* (2013.01)

(58) Field of Classification Search
CPC ...... H02J 7/0048; H02J 50/12; H02J 7/00714; H02J 7/00036; H02J 50/80; H02J 50/10;
(Continued)

(56) References Cited

U.S. PATENT DOCUMENTS

| | | | |
|---|---|---|---|
| 5,640,081 | A | 6/1997 | Austin et al. |
| 5,982,148 | A | 11/1999 | Mercer |

(Continued)

FOREIGN PATENT DOCUMENTS

| | | | |
|---|---|---|---|
| CN | 103135057 B | | 8/2015 |
| JP | 3174770 B2 | | 6/2001 |

(Continued)

OTHER PUBLICATIONS

Extended European Search Report including Written Opinion for Application No. 22883916.3 dated Aug. 19, 2024, pp. 1-9.
(Continued)

*Primary Examiner* — Vinh P Nguyen
(74) *Attorney, Agent, or Firm* — Lerner David LLP

(57) ABSTRACT

A battery life prediction apparatus according to an embodiment disclosed herein includes a processor and memory having programmed thereon instructions that, when executed, are configured to cause the processor to obtain information about a charge end voltage of a battery corresponding to a charge protocol and predict a life of the battery corresponding to the charge protocol based on the information about the charge end voltage of the battery corresponding to the charge protocol.

13 Claims, 3 Drawing Sheets

(58) Field of Classification Search
CPC ...... H02J 7/005; H02J 7/00712; H02J 50/005; H02J 7/0047; B60R 16/033; H04B 5/79; G01R 19/16542; G01R 31/3842
See application file for complete search history.

(56) References Cited

U.S. PATENT DOCUMENTS

| | | | |
|---|---|---|---|
| 6,417,646 B1 * | 7/2002 | Huykman | G01R 31/396 320/122 |
| 6,507,171 B2 * | 1/2003 | Ruha | H01M 10/44 320/128 |
| 10,036,779 B2 * | 7/2018 | Sazhin | G01R 31/003 |
| 2017/0153290 A1 | 6/2017 | Sazhin et al. | |
| 2018/0164363 A1 | 6/2018 | Brorein et al. | |
| 2020/0067147 A1 | 2/2020 | Goto et al. | |
| 2020/0243920 A1 | 7/2020 | Yoon et al. | |

FOREIGN PATENT DOCUMENTS

| | | |
|---|---|---|
| JP | 3317599 B2 | 8/2002 |
| JP | 2003100351 A | 4/2003 |
| JP | 2003317810 A | 11/2003 |
| JP | 2006147389 A | 6/2006 |
| JP | 2008216270 A | 9/2008 |
| JP | 2012083263 A | 4/2012 |
| JP | 2013242281 A | 12/2013 |
| JP | 2014222603 A | 11/2014 |
| JP | 6329788 B2 | 5/2018 |
| JP | 2018096960 A | 6/2018 |
| JP | 2020030916 A | 2/2020 |
| JP | 2020532061 A | 11/2020 |
| JP | 2021113731 A | 8/2021 |
| KR | 20190071342 A | 6/2019 |
| KR | 20190125824 A | 11/2019 |
| KR | 20200062875 A | 6/2020 |

OTHER PUBLICATIONS

International Search Report for Application No. PCT/KR2022/015702 mailed Jan. 30, 2023. 3 pages.

* cited by examiner

BATTERY SELF-DISCHARGE CURRENT MEASUREMENT APPARATUS AND OPERATING METHOD THEREOF

CROSS-REFERENCE TO RELATED APPLICATION

The present application is a national phase entry under 35 U.S.C. § 371 of International Application No. PCT No. PCT/KR2022/015702 filed Oct. 17, 2022, which claims priority from Korean Patent Application No. 10-2021-0138632 filed Oct. 18, 2021, all of which are incorporated herein by reference.

TECHNICAL FIELD

Embodiments disclosed herein relate to a battery self-discharge current measurement apparatus and an operating method thereof.

BACKGROUND ART

An electric vehicle is supplied with electricity from outside to charge a battery cell, and then a motor is driven by a voltage charged in the battery cell to obtain power. Battery cells of electric vehicles repeatedly expand and contract due to chemical reactions that occur in a process of charging and discharging electricity, such that a risk of explosion may exist. Thus, the stability of a battery cell has to be verified through various tests in production.

A battery cell testing system may monitor a self-discharge current of a battery cell. However, a general battery cell testing system has to store and monitor multiple large-capacity battery cells for a long time, requiring a cost for maintaining a space in which the multiple large-capacity battery cells are stored, and a long time required for monitoring.

SUMMARY

Technical Problem

Embodiments disclosed herein provide a battery self-discharge current measurement apparatus and an operating method thereof in which a cost for measurement of a self-discharge current of a battery cell may be reduced and the efficiency of the measurement may be improved.

Technical problems of the embodiments disclosed herein are not limited to the above-described technical problems, and other unmentioned technical problems would be clearly understood by one of ordinary skill in the art from the following description.

Technical Solution

A battery self-discharge current measurement apparatus according to an embodiment disclosed herein includes a first resistor connected to a battery, a voltage generator configured to generate a second output voltage based on a first output voltage generated based on a voltage applied to the battery and the first resistor and a second output signal generated by converting the first output voltage, and apply the second output voltage to a second resistor, and a controller configured to monitor a current applied to the second resistor.

According to an embodiment, the voltage generator may be further configured to generate a first output signal by converting the first output voltage from analog to digital, and generate a second output signal by converting the first output signal from digital to analog.

According to an embodiment, the voltage generator may include a first comparator configured to receive the voltage applied to the battery and the first resistor, an analog-to-digital converter (ADC) configured to receive the first output voltage of the first comparator and convert the first output voltage from analog to digital as the first output signal, a digital-to-analog converter (DAC) configured to receive the first output signal of the ADC and convert the first output signal of the ADC from digital to analog as a second output signal, a second comparator configured to compare the first output voltage of the first comparator with the second output signal of the DAC, and the second resistor connected between the first resistor and the second comparator.

According to an embodiment, the controller may be further configured to monitor a current applied to the second resistor based on a potential difference between the second output voltage of the second comparator and the voltage applied to the first resistor.

According to an embodiment, the controller may be further configured to determine that the monitored current is a self-discharge current of the battery when a value of the monitored current value is constant.

According to an embodiment, the controller may be further configured to set a reference voltage of the DAC based on the monitored current.

According to an embodiment, the controller may be further configured to set the reference voltage of the DAC based on the calculated current value and a minimum resolution of the DAC when the value of the monitored current is different from a reference current value.

An operating method of a battery self-discharge current measurement apparatus according to an embodiment disclosed herein includes generating a first output voltage based on a voltage applied to a battery and a first resistor connected to the battery, generating a first output signal by converting the first output voltage from analog to digital, generating a second output signal by converting the first output signal from digital, generating a second output voltage based on the first output voltage and the second output signal, and monitoring a current applied to a second resistor to which the second output voltage is applied.

According to an embodiment, monitoring the current applied to the second resistor to which the second output voltage is applied may include monitoring the current applied to the second resistor arranged between the first resistor and a second comparator.

According to an embodiment, monitoring the current applied to the second resistor to which the second output voltage is applied may include monitoring the current applied to the second resistor based on a potential difference between the second output voltage and the voltage applied to the first resistor.

According to an embodiment, monitoring the current applied to the second resistor to which the second output voltage is applied may include determining that the monitored current is a self-discharge current of the battery when a value of the monitored current value is constant.

According to an embodiment, the operating method may further include setting a reference voltage of the DAC based on the monitored current.

According to an embodiment, the setting of the reference voltage of the DAC based on the result of the monitoring may include setting the reference voltage of the DAC based on a calculated current value and a minimum resolution of the DAC when the value of the monitored current is different from a reference current value.

Advantageous Effects

With a battery self-discharge current measurement apparatus and an operating method thereof according to an embodiment disclosed herein, it is possible to reduce a cost for measurement of a self-discharge current of a battery cell and improve the efficiency of the measurement.

DETAILED DESCRIPTION

Figure 1:
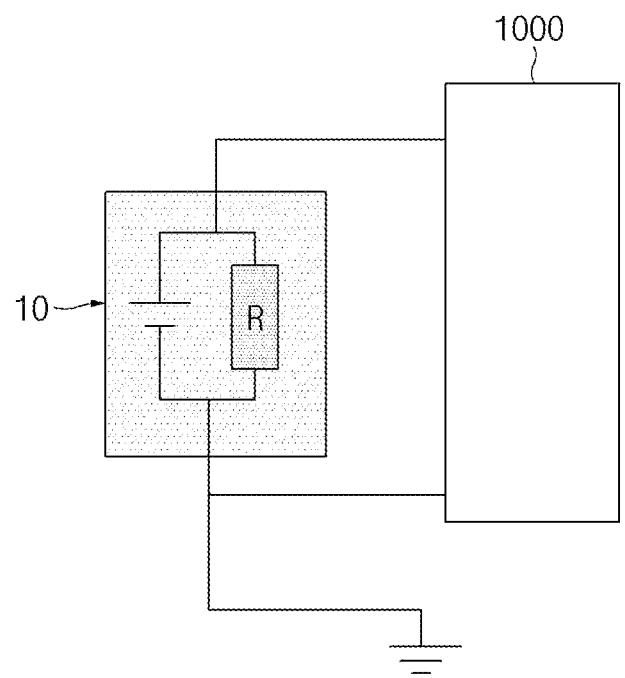
FIG. 1 is a view for generally describing a battery self-discharge current measurement apparatus according to an embodiment disclosed herein.

Hereinafter, some embodiments disclosed in this document will be described in detail with reference to the exemplary drawings. In adding reference numerals to components of each drawing, it should be noted that the same components are given the same reference numerals even though they are indicated in different drawings. In addition, in describing the embodiments disclosed in this document, when it is determined that a detailed description of a related known configuration or function interferes with the understanding of an embodiment disclosed in this document, the detailed description thereof will be omitted.

To describe a component of an embodiment disclosed herein, terms such as first, second, A, B, (a), (b), etc., may be used. These terms are used merely for distinguishing one component from another component and do not limit the component to the essence, sequence, order, etc., of the component. The terms used herein, including technical and scientific terms, have the same meanings as terms that are generally understood by those skilled in the art, as long as the terms are not differently defined. Generally, the terms defined in a generally used dictionary should be interpreted as having the same meanings as the contextual meanings of the relevant technology and should not be interpreted as having ideal or exaggerated meanings unless they are clearly defined in the present document.

FIG. 1 is a view for generally describing a battery self-discharge current measurement apparatus according to an embodiment disclosed herein.

Referring to FIG. 1, a battery 10 may include a battery cell that is a basic unit of a battery capable of using electric energy by charge and discharge. The battery cell may be a lithium ion (Li-ion) battery, an Li-ion polymer battery, a nickel-cadmium (Ni—Cd) battery, a nickel hydrogen (Ni-MH) battery, etc., and is not limited thereto. The battery cell may supply power to a target device (not shown). To this end, the battery cell may be electrically connected to the target device. Herein, the target device may include an electrical, electronic, or mechanical device that operates by receiving power from a battery pack (not shown) including a plurality of battery cells. Herein, the target device may be, but not limited to, large products that require high output, such as electric vehicles or hybrid vehicles, and power storage devices that store surplus power or renewable energy or power storage devices for backup as well as small products such as digital cameras, P-DVDs, MP3P, mobile phones, PDAs, portable game devices, power tools, E-bikes, etc.

The battery 10 may include a resistor R causing self-discharge. The self-discharge is one of capacity losses of the battery 10 and is a phenomenon in which the capacity of the battery 10 is naturally reduced inside the battery 10 without external discharge during charge and discharge of the battery 10 or in an open state. A self-discharge current flows inside the battery 10 due to a parasitic resistance R therein, and a voltage of the battery 10 may gradually decrease. A path of the self-discharge current of the battery 10 is inside the battery 10, such that the self-discharge current may not be measured with a general current sensor.

The self-discharge phenomenon of the battery 10 may cause not only capacity reduction of the battery 10, but also unbalancing between battery cells or performance degradation of the entire battery system, and thus has to be managed with great importance in terms of stability of the battery system.

A battery self-discharge current measurement apparatus 1000 may be connected to the battery 10 to measure a self-discharge current caused by the internal resistor R of the battery 10. The battery self-discharge current measurement apparatus 1000 may measure a voltage of the battery 10 and convert the measured voltage to generate a constant voltage. The battery self-discharge current measurement apparatus 1000 may monitor a change of a current based on the generated constant voltage. When the monitored current value is constant, the battery self-discharge current measurement apparatus 1000 may be calculated as the self-discharge current caused by the internal resistor R of the battery 10.

Hereinbelow, a configuration of the battery self-discharge current measurement apparatus 1000 will be described with reference to FIG. 2.

Figure 2:
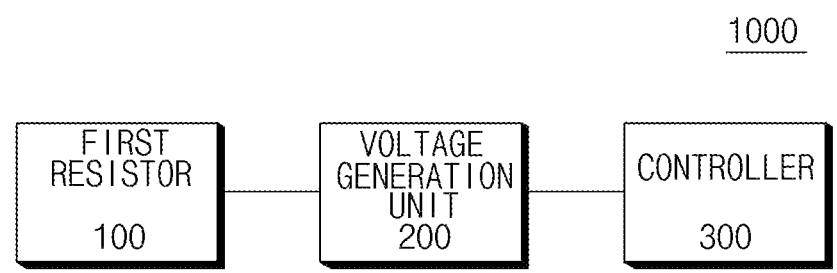
FIG. 2 is a block diagram illustrating a configuration of a battery self-discharge current measurement apparatus, according to an embodiment disclosed herein.

FIG. 2 is a block diagram illustrating a configuration of a battery self-discharge current measurement apparatus, according to an embodiment disclosed herein.

Referring to FIG. 2, the battery self-discharge current measurement apparatus 1000 may include a first resistor 100, a voltage generation unit 200, and a controller 300.

The first resistor 100 may be serially connected to the battery 10. The first resistor 100 may correct an error of a self-discharge current value due to limited performance of a circuit configuration of the battery self-discharge current measurement apparatus 1000. More specifically, due to limitation in performance of a circuit configuration for measuring a self-discharge current of the battery 10 or mis-match between circuit configurations, a calculated value of the self-discharge current of the battery 10 may be calculated as a value greater than an actual self-discharge current value.

By being serially connected to the battery 10, the first resistor 100 may prevent the calculated self-discharge current value of the battery 10 from sharply changing due to the limitation in performance of a circuit configuration for measuring a self-discharge current of the battery 10 or the mis-match between circuit configurations.

The voltage generation unit 200 may output a voltage based on a voltage applied to the battery and the first resistor 100. More specifically, the voltage generation unit 200 may generate a first output voltage based on the voltage applied to the battery 10 and the first resistor 100.

The voltage generation unit 200 may generate a second output voltage based on the first output voltage and a second output signal generated by converting the first output voltage. For example, the voltage generation unit 200 may generate the first output signal by analog-to-digital converting the first output voltage. In addition, the voltage generation unit 200 may generate the second output signal by digital-to-analog converting the first output signal.

The voltage generation unit 200 may apply the second output voltage to a second resistor 250 in the voltage generation unit 200.

The controller 300 may monitor a current applied to the second resistor 250. The controller 300 may monitor the current applied to the second resistor 250 based on a potential difference between the second output voltage and the voltage applied to the first resistor 100.

For example, when the monitored current value is constant, the controller 300 may calculate a current value as the self-discharge current of the battery. For example, when the self-discharge current value caused by the resistor R parasitic inside the battery 10 is the same as a previously stored reference current value, a current value monitored by the controller 300 may be identical to the self-discharge current value of the battery 10. Thus, when the monitored current value is constant, the controller 300 may calculate a current value as the self-discharge current of the battery 10.

The controller 300 may set a reference voltage of a digital-to-analog converter (DAC) 230 of the voltage generation unit 200. The controller 300 may set a reference voltage of the DAC 230 based on a previously measured battery voltage.

The controller 300 may set the reference voltage of the DAC 230 based on a monitoring result. For example, the controller 300 may change the reference voltage of the DAC 230 when a current value calculated based on the monitoring result is greater than the previously stored reference current value. For example, the controller 300 may set the reference voltage of the DAC 230 based on the calculated current value and a minimum resolution of the DAC 230.

The controller 300 may set the reference voltage of the DAC 230 and calculate the current value as the self-discharge current of the battery when the monitored current value is constant.

Figure 3:
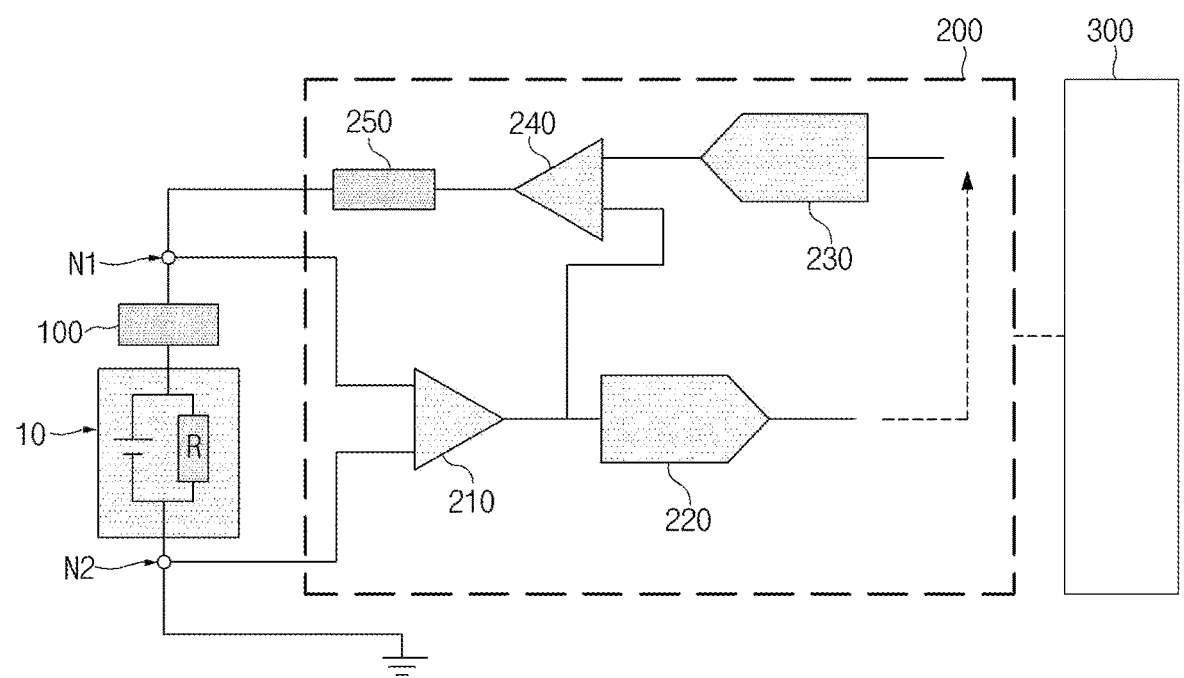
FIG. 3 is a view for generally describing a configuration of a voltage generation unit according to an embodiment disclosed herein.

FIG. 3 is a view for generally describing a configuration of a voltage generation unit according to an embodiment disclosed herein. Hereinbelow, a configuration of the voltage generation unit 200 will be described with reference to FIG. 3.

Referring to FIG. 3, the voltage generation unit 200 may include a first comparator 210, an analog-to-digital converter (ADC) 220, the DAC 230, a second comparator 240, and the second resistor 250.

The first comparator 210 may receive the voltage applied to the battery and the first resistor 100. The first comparator 210 may compare a voltage in an upper end N1 of the first resistor 100 with a voltage in a lower end N2 of the battery. The first comparator 210 may generate the first output voltage based on the voltage in the upper end N1 of the first resistor 100 and the voltage in the lower end N2 of the battery.

The ADC 220 may receive the first output voltage of the first comparator 210 as an input signal. The ADC 220 may generate the first output signal by converting the first output voltage into a digital signal.

The DAC 230 may receive the first output voltage of the ADC 220 as an input signal. The DAC 230 may generate the second output signal by converting the first output signal into an analog signal.

The second comparator 240 may receive the first output voltage of the first comparator 210 and the second output signal of the DAC 230. The second comparator 240 may compare the first output voltage with the second output signal. The second comparator 240 may generate the second output voltage based on the first output voltage and the second output signal.

The second resistor 250 may be connected between the first resistor 100 and the second comparator 240. The second resistor 250 may receive the second output voltage of the second comparator 240.

The controller 300 may monitor the current applied to the second resistor 250 based on a potential difference between the second output voltage of the second comparator 240 and the voltage applied to the first resistor 100.

As described above, the battery self-discharge current measurement apparatus 1000 according to an embodiment disclosed herein may reduce a cost for measurement of a self-discharge current of a battery cell and improve the efficiency of the measurement.

The battery self-discharge current measurement apparatus 1000 may calculate an accurate self-discharge current by reducing an error of the self-discharge current caused by a performance problem of the circuit configuration.

Figure 4:
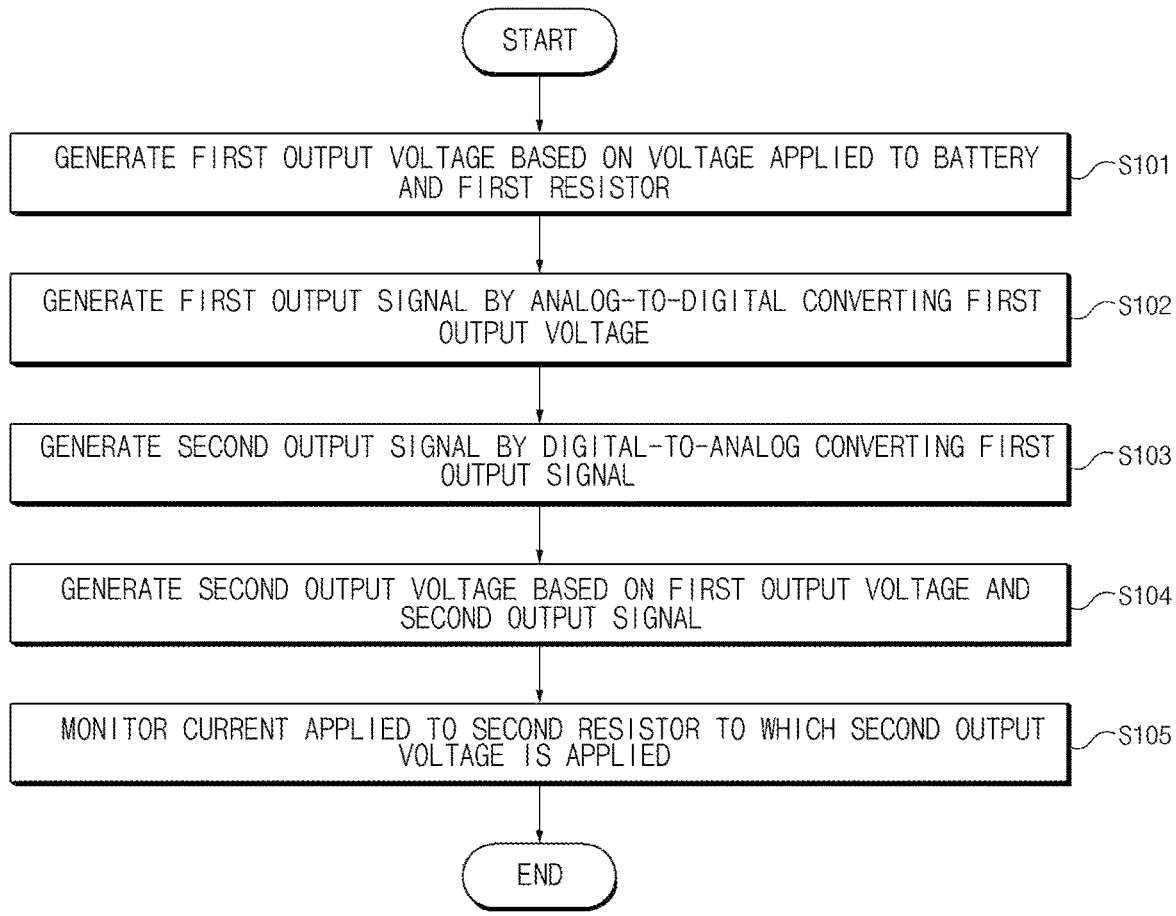
FIG. 4 is a flowchart of an operating method of a battery self-discharge current measurement apparatus, according to an embodiment disclosed herein.

FIG. 4 is a flowchart of an operating method of a battery self-discharge current measurement apparatus, according to an embodiment disclosed herein.

Hereinbelow, an operating method of the battery self-discharge current measurement apparatus 1000 will be described with reference to FIGS. 1 to 3.

The battery self-discharge current measurement apparatus 1000 may include the first resistor 100, the voltage generation unit 200, and the controller 300. The voltage generation unit 200 may include the first comparator 210, the ADC 220, the DAC 230, the second comparator 240, and the second resistor 250.

The battery self-discharge current measurement apparatus 1000 may be substantially the same as the battery self-discharge current measurement apparatus 1000 described with reference to FIGS. 1 to 3, and thus will be briefly described to avoid redundant description.

Figure 5:
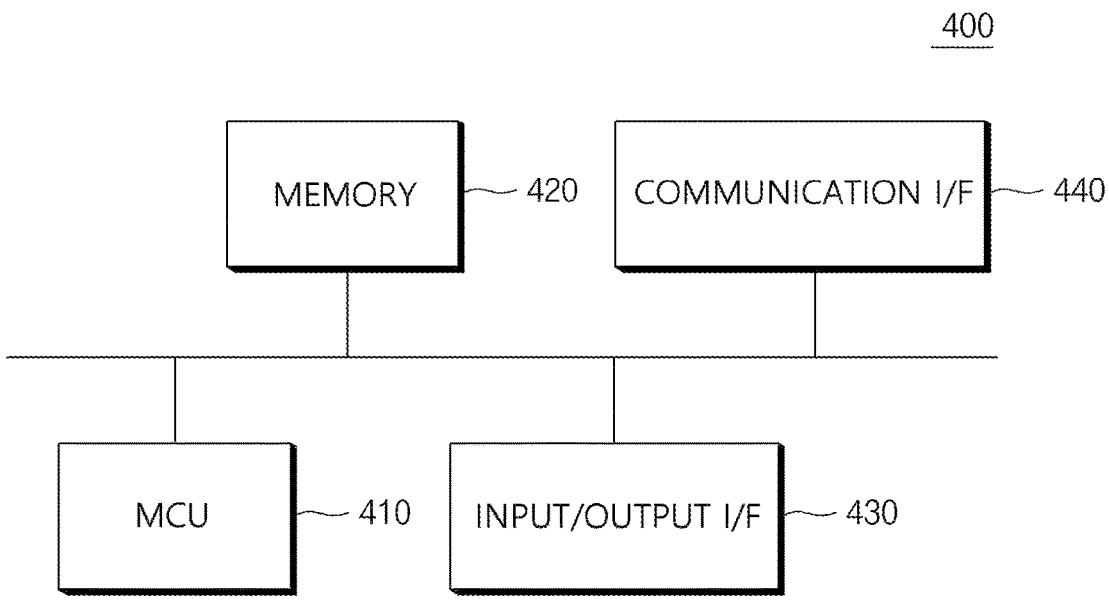
FIG. 5 is a block diagram showing a hardware configuration of a computing system for performing an operating method of a battery self-discharge current measurement apparatus, according to an embodiment disclosed herein.

Referring to FIG. 5, an operating method of the battery self-discharge current measurement apparatus 1000 may include operation S101 of generating a first output voltage based on a voltage applied to the battery 10 and the first resistor 100 connected to the battery, operation S102 of generating a first output signal by analog-to-digital converting the first output voltage, operation S103 of generating a second output signal by digital-to-analog converting the first output signal, operation S104 of generating a second output voltage based on the first output voltage and the second output signal, and operation S105 of monitoring a current applied to the second resistor 250 to which the second output voltage is applied.

Hereinbelow, operations S101 through S105 will be described in detail.

In operation S101, the first comparator 210 may receive the voltage applied to the battery and the first resistor 100. In operation S101, the first comparator 210 may compare a voltage in an upper end of the first resistor 100 with a voltage in a lower end of the battery. In operation S101, the first comparator 210 may generate a first output voltage based on the voltage applied to the first resistor 100.

In operation S102, the ADC 220 may receive the first output voltage of the first comparator 210 as an input signal. In operation S102, the ADC 220 may generate the first output signal by analog-to-digital converting the first output voltage. In operation S102, the ADC 220 may generate the first output signal by converting the first output voltage into a digital signal.

In operation S103, the DAC 230 may receive the first output voltage of the ADC 220 as an input signal. In operation S103, the DAC 230 may generate the second output signal by converting the first output signal into an analog signal.

In operation S104, the second comparator 240 may receive the first output voltage of the first comparator 210 and the second output signal of the DAC 230. In operation S104, the second comparator 240 may compare the first output voltage with the second output signal. In operation S104, the second comparator 240 may generate the second output voltage based on the first output voltage and the second output signal.

In operation S105, the controller 300 may monitor a current applied to the second resistor 250 to which the second output voltage is applied. In operation S105, the controller 300 may monitor the current applied to the second resistor 250 based on a potential difference between the second output voltage and the voltage applied to the first resistor 100.

In operation S105, when the monitored current value is constant, the controller 300 may calculate a current value as the self-discharge current of the battery.

In operation S105, the controller 300 may set the reference voltage of the DAC 230 based on a monitoring result.

In operation S106, the controller 300 may set the reference voltage of the DAC 230 based on the calculated current value and a minimum resolution of the DAC 230, when the calculated current value is different from the reference current value.

FIG. 5 is a block diagram showing a hardware configuration of a computing system for performing an operating method of a battery self-discharge current measurement apparatus, according to an embodiment disclosed herein.

Referring to FIG. 5, a computing system 400 according to an embodiment disclosed herein may include an MCU 410, a memory 420, an input/output I/F 430, and a communication I/F 440.

The MCU 410 may be a processor that executes various programs (e.g., a program for monitoring a self-discharge current of the battery 10, etc.) stored in the memory 420, processes various data through these programs, and performs the above-described functions of the battery self-discharge current measurement apparatus 1000 shown in FIG. 1.

The memory 420 may store various programs regarding operations of the battery self-discharge current measurement apparatus 1000. Moreover, the memory 420 may store operation data of the battery self-discharge current measurement apparatus 1000.

The memory 420 may be provided in plural, depending on a need. The memory 420 may be volatile memory or non-volatile memory. For the memory 420 as the volatile memory, random access memory (RAM), dynamic RAM (DRAM), static RAM (SRAM), etc., may be used. For the memory 420 as the nonvolatile memory, read only memory (ROM), programmable ROM (PROM), electrically alterable ROM (EAROM), erasable PROM (EPROM), electrically erasable PROM (EEPROM), flash memory, etc., may be used. The above-listed examples of the memory 420 are merely examples and are not limited thereto.

The input/output I/F 430 may provide an interface for transmitting and receiving data by connecting an input device (not shown) such as a keyboard, a mouse, a touch panel, etc., and an output device such as a display (not shown), etc., to the MCU 410.

The communication I/F 440, which is a component capable of transmitting and receiving various data to and from a server, may be various devices capable of supporting wired or wireless communication. For example, a program for resistance measurement and abnormality diagnosis of the battery cell or various data may be transmitted and received to and from a separately provided external server through the communication I/F 440.

As such, a computer program according to an embodiment disclosed herein may be recorded in the memory 420 and processed by the MCU 410, thus being implemented as a module that performs respective functions of the battery self-discharge current measurement apparatus 1000 shown in FIGS. 1 to 3.

The above description is merely illustrative of the technical idea of the present disclosure, and various modifications and variations will be possible without departing from the essential characteristics of the present disclosure by those of ordinary skill in the art to which the present disclosure pertains.

Therefore, the embodiments disclosed in the present disclosure are intended for description rather than limitation of the technical spirit of the present disclosure and the scope of the technical spirit of the present disclosure is not limited by these embodiments. The protection scope of the present disclosure should be interpreted by the following claims, and all technical spirits within the same range should be understood to be included in the range of the present disclosure.

The invention claimed is:

1. A battery self-discharge current measurement apparatus comprising:
    a first resistor connected to a battery;
    a voltage generator configured to generate a second output voltage based on a first output voltage generated based on a voltage applied to the battery and the first resistor and a second output signal generated by converting the first output voltage, and apply the second output voltage to a second resistor; and
    a controller configured to monitor a current applied to the second resistor.

2. The battery self-discharge current measurement apparatus of claim 1, wherein the voltage generator is further configured to generate a first output signal by converting the first output voltage from analog to digital, and generate a second output signal by converting the first output signal from digital to analog.

3. The battery self-discharge current measurement apparatus of claim 1, wherein the voltage generator comprises:
    a first comparator configured to receive the voltage applied to the battery and the first resistor;
    an analog-to-digital converter (ADC) configured to receive the first output voltage of the first comparator and convert the first output voltage from analog to digital as the first output signal;

a digital-to-analog converter (DAC) configured to receive the first output signal of the ADC and convert the first output signal of the ADC from digital to analog as a second output signal;

a second comparator configured to compare the first output voltage of the first comparator with the second output signal of the DAC; and the second resistor connected between the first resistor and the second comparator.

4. The battery self-discharge current measurement apparatus of claim 3, wherein the controller is further configured to monitor a current applied to the second resistor based on a potential difference between the second output voltage of the second comparator and the voltage applied to the first resistor.

5. The battery self-discharge current measurement apparatus of claim 4, wherein the controller is further configured to determine that the monitored current is a self-discharge current of the battery when a value of the monitored current value is constant.

6. The battery self-discharge current measurement apparatus of claim 5, wherein the controller is further configured to set a reference voltage of the DAC based on the monitored current.

7. The battery self-discharge current measurement apparatus of claim 6, wherein the controller is further configured to set the reference voltage of the DAC based on the calculated current value and a minimum resolution of the DAC when the value of the monitored current is different from a reference current value.

8. An operating method of a battery self-discharge current measurement apparatus, the operating method comprising:

generating a first output voltage based on a voltage applied to a battery and a first resistor connected to the battery;

generating a first output signal converting the first output voltage from analog to digital;

generating a second output signal converting the first output signal from digital to analog;

generating a second output voltage based on the first output voltage and the second output signal; and monitoring a current applied to a second resistor to which the second output voltage is applied.

9. The operating method of claim 8, wherein monitoring the current applied to the second resistor to which the second output voltage is applied comprises monitoring the current applied to the second resistor arranged between the first resistor and a second comparator.

10. The operating method of claim 8, wherein monitoring the current applied to the second resistor to which the second output voltage is applied comprises monitoring the current applied to the second resistor based on a potential difference between the second output voltage and the voltage applied to the first resistor.

11. The operating method of claim 9, wherein monitoring the current applied to the second resistor to which the second output voltage is applied comprises determining that the monitored current is a self-discharge current of the battery when a value of the monitored current value is constant.

12. The operating method of claim 9, further comprising setting a reference voltage of the DAC based on the monitored current.

13. The operating method of claim 12, wherein the setting of the reference voltage of the DAC based on the result of the monitoring comprises setting the reference voltage of the DAC based on a calculated current value and a minimum resolution of the DAC when the value of the monitored current is different from a reference current value.

* * * * *